US012409647B2

(12) United States Patent
Takagi

(10) Patent No.: US 12,409,647 B2
(45) Date of Patent: Sep. 9, 2025

(54) LIQUID DISCHARGE HEAD SUBSTRATE, LIQUID DISCHARGE HEAD, AND LIQUID DISCHARGE APPARATUS

(71) Applicant: CANON KABUSHIKI KAISHA, Tokyo (JP)

(72) Inventor: Makoto Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 18/190,406

(22) Filed: Mar. 27, 2023

(65) Prior Publication Data

US 2023/0321975 A1 Oct. 12, 2023

(30) Foreign Application Priority Data

Apr. 6, 2022 (JP) ................................ 2022-063544

(51) Int. Cl.
*B41J 2/045* (2006.01)
*B41J 2/14* (2006.01)

(52) U.S. Cl.
CPC ......... *B41J 2/04563* (2013.01); *B41J 2/0458* (2013.01); *B41J 2/1433* (2013.01)

(58) Field of Classification Search
CPC ..... B41J 2/04563; B41J 2/0458; B41J 2/1433
See application file for complete search history.

(56) References Cited

U.S. PATENT DOCUMENTS

| | | | | |
|---|---|---|---|---|
| 4,827,294 | A * | 5/1989 | Hanson | B41J 25/34 347/56 |
| 2009/0309913 | A1 | 12/2009 | Oohashi | |
| 2011/0292127 | A1* | 12/2011 | Oohashi | B41J 2/04563 347/50 |
| 2013/0093808 | A1* | 4/2013 | Kanno | B41J 2/0451 347/47 |
| 2014/0300660 | A1* | 10/2014 | Hirayama | B41J 2/072 347/17 |
| 2019/0001667 | A1 | 1/2019 | Kasai | |

FOREIGN PATENT DOCUMENTS

| | | |
|---|---|---|
| JP | 2009298107 A | 12/2009 |

* cited by examiner

*Primary Examiner* — Jason S Uhlenhake
(74) *Attorney, Agent, or Firm* — Canon U.S.A., Inc. IP Division

(57) ABSTRACT

A liquid discharge head substrate includes a substrate, a plurality of liquid discharge elements, a liquid supply port, temperature detection elements, and a driving wiring pattern. The plurality of liquid discharge elements are arranged in a first direction on a major surface of the substrate to discharge a liquid. The liquid supply port is provided in the substrate and is spaced apart from the plurality of liquid discharge elements in a second direction crossing the first direction to supply the liquid to the plurality of liquid discharge elements. The temperature detection elements are arranged on the substrate to detect a temperature. The driving wiring pattern extends in the second direction to an end portion of the substrate to drive the temperature detection elements, is connected to an external connection terminal, and is shared between the temperature detection elements.

13 Claims, 13 Drawing Sheets

LIQUID DISCHARGE HEAD SUBSTRATE, LIQUID DISCHARGE HEAD, AND LIQUID DISCHARGE APPARATUS

BACKGROUND OF THE INVENTION

Field

The present disclosure relates to a liquid discharge head substrate, a liquid discharge head, and a liquid discharge apparatus.

Description of the Related Art

A liquid discharge head that applies energy to a liquid using a discharge element and discharges the liquid from an orifice is widely used. Japanese Patent Laid-Open No. 2009-298107 discloses an arrangement in which a substrate temperature detection element is provided on a record head substrate to detect the temperature of the record head substrate and control the liquid discharge characteristics.

SUMMARY OF THE INVENTION

A wiring pattern for operating a temperature detection element needs to be connected to the temperature detection element. When a plurality of temperature detection elements are arranged to measure the temperature of each portion of the substrate, a region necessary for the wiring pattern connected to the temperature detection elements widens, and the wiring regions of wiring patterns connected to discharge elements and other elements narrow. When the wiring region narrows and thus the line width of the wiring pattern connected to the discharge elements is decreased, the wiring resistance may rise, degrading the characteristics of the liquid discharge head.

An embodiment of the present disclosure provides a technique advantageous in measuring the substrate temperature of a liquid discharge head substrate.

According to an aspect of the present disclosure, a liquid discharge head substrate includes a substrate, a plurality of liquid discharge elements arranged in a first direction on a major surface of the substrate to discharge a liquid, a liquid supply port provided in the substrate and spaced apart from the plurality of liquid discharge elements in a second direction crossing the first direction to supply the liquid to the plurality of liquid discharge elements, a plurality of temperature detection elements arranged on the substrate to detect a temperature of the substrate, and a driving wiring pattern that extends in the second direction to drive the plurality of temperature detection elements, wherein the driving wiring pattern extends to an end portion of the substrate in the second direction, is connected to an external connection terminal, and is shared between the plurality of temperature detection elements.

Further features of the present disclosure will become apparent from the following description of exemplary embodiments (with reference to the attached drawings).

DESCRIPTION OF THE EMBODIMENTS

Figure 1:
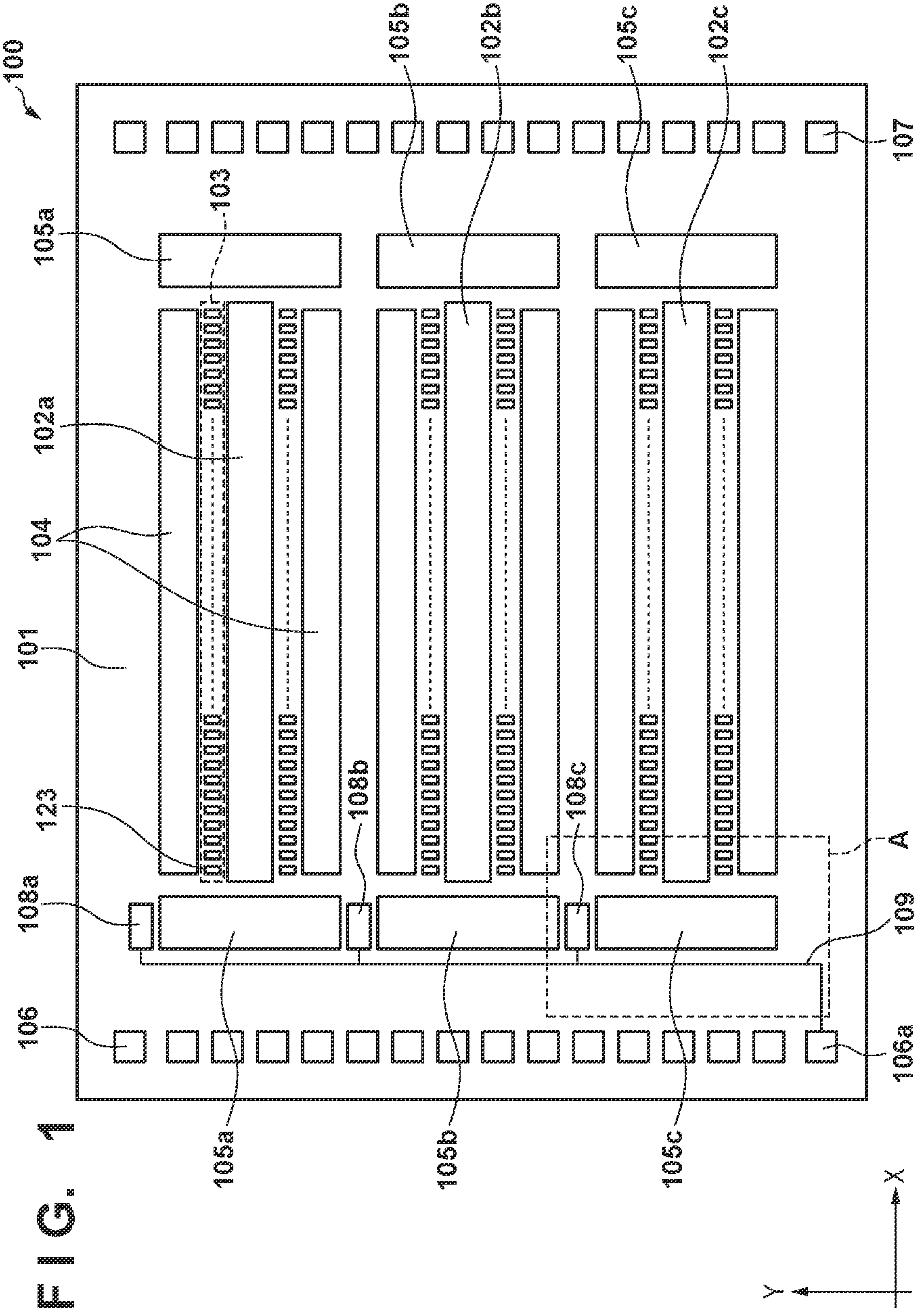
FIG. 1 is a schematic plan view showing an example of the arrangement of a liquid discharge head substrate according to an embodiment.

Hereinafter, embodiments will be described in detail with reference to the attached drawings. Note, the following embodiments are not intended to limit the scope of the subject matter of the terms in the claims. Multiple features are described in the embodiments, but limitation is not made to require all such features, and multiple such features may be combined as appropriate. Furthermore, in the attached drawings, the same reference numerals are given to the same or similar configurations, and redundant description thereof is omitted.

A liquid discharge head substrate according to an embodiment of this disclosure will be described with reference to FIGS. 1 to 11. FIG. 1 is a schematic plan view showing an example of the arrangement of a liquid discharge head substrate 100 according to the embodiment. The liquid discharge head substrate 100 according to the embodiment includes a substrate 101, a plurality of liquid discharge elements 123 that are arranged in the X direction on the major surface of the substrate 101 to discharge a liquid, liquid supply ports 102 that are provided on the substrate 101 and spaced apart from the plurality of liquid discharge elements 123 in the Y direction crossing the X direction to supply the liquid to the plurality of liquid discharge elements 123, a plurality of temperature detection units 108 that are each arranged on the substrate 101 and each include a temperature detection element D1 (shown in FIG. 2) to detect the temperature of the substrate 101, and a driving wiring pattern 109 for driving the temperature detection elements D1 arranged in the respective temperature detection units 108. When a specific temperature detection unit 108 out of the plurality of temperature detection units 108 is referred to, a suffix is added to the reference numeral, like a temperature detection unit 108"*a*". When the temperature detection unit 108 need not be discriminated, it will be simply referred to as the "temperature detection unit 108". This also applies to the remaining constituent components.

The substrate 101 has a substantially rectangular shape with a long side in the X direction (longitudinal direction) and a short side in the Y direction (widthwise direction).

Each liquid supply port 102 has a long groove shape with a long side in the X direction that extends through the substrate 101. The liquid discharge elements 123 for discharging a liquid are arranged in a line in the X direction along each liquid supply port 102, and constitute a liquid discharge element array 103. Driver circuits 104 include one or more circuits for driving the liquid discharge elements 123 are arranged along the liquid supply ports 102.

In the arrangement shown in FIG. 1, three liquid supply ports 102*a* to 102*c* are arranged in the substrate 101. Control circuits 105*a* to 105*c* include one or more circuits for supplying control signals to the driver circuits 104 are arranged at two ends of the liquid discharge element arrays 103 on the substrate 101 so that the control circuits 105*a* to 105*c* are spaced apart in the X direction. Further, external connection terminals 106 and 107 are arranged on the substrate 101 to supply power to the liquid discharge head substrate including the control circuits 105 and supply a data signal to the control circuits 105. The external connection terminals 106 and 107 are arranged at two ends of the substrate 101 in the X direction.

The temperature detection units 108 are arranged in a region between the external connection terminals 106 and the driver circuits 104 in the X direction. In the arrangement shown in FIG. 1, temperature detection units 108*a* to 108*c* are arranged in correspondence with the liquid supply ports 102*a* to 102*c*, respectively. The driving wiring pattern 109 for supplying a driving current to drive the temperature detection elements D1 arranged in the temperature detection units 108 is arranged near the temperature detection units 108*a* to 108*c*. The driving wiring pattern 109 is connected to an external connection terminal 106*a*. The driving wiring pattern 109 is shared between the plurality of temperature detection units 108 (plurality of temperature detection elements D1).

Figure 2:
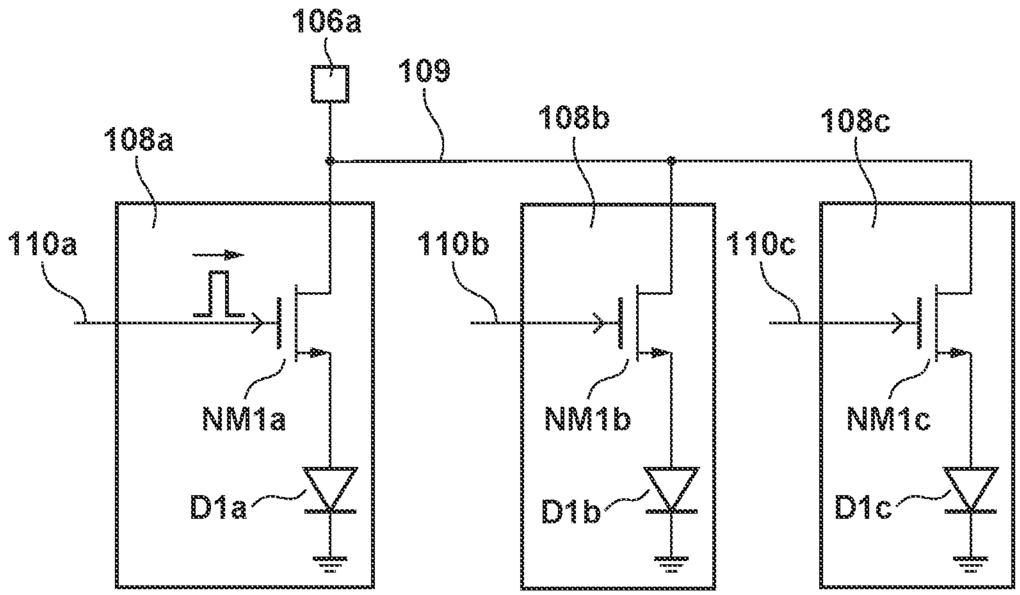
FIG. 2 is an equivalent circuit diagram showing an example of the arrangement of the temperature detection unit of the liquid discharge head substrate in FIG. 1.

FIG. 2 is an equivalent circuit diagram showing an example of the connection relationship between the temperature detection units 108*a* to 108*c* and the driving wiring pattern 109 according to the embodiment. Each temperature detection unit 108 includes the temperature detection element D1. FIG. 2 shows an example in which a diode sensor is used as the temperature detection element D1. Of two terminals of the temperature detection element D1, an anode terminal is connected to the source terminal of a switching element NM1. FIG. 2 shows an example in which a NMOS transistor is used as the switching element NM1. The drain terminal of the switching element NM1 is connected to the driving wiring pattern 109. That is, the respective temperature detection elements D1 arranged in the temperature detection units 108*a* to 108*c* are connected to the driving wiring pattern 109 via the switching elements NM1. The drain terminals of switching elements NM1*a* to NM1*c* of the temperature detection units 108*a* to 108*c* are commonly connected to the driving wiring pattern 109. The cathode terminal of the temperature detection element D1 is connected to the ground potential. The gate terminal of the switching element NM1 is connected to a control wiring pattern 110. The switching elements NM1*a* to NM1*c* operate to exclusively connect, to the driving wiring pattern 109, temperature detection elements D1*a* to D1*c* arranged in the temperature detection units 108*a* to 108*c* in accordance with the potentials of control wiring patterns 110*a* to 110*c*.

In the embodiment, a current is supplied from the external connection terminal 106*a* to the temperature detection element D1 of the selected temperature detection unit 108, and a voltage between the two terminals of the temperature detection element D1 that changes depending on the temperature is monitored via the external connection terminal 106*a*, thereby detecting the temperature. A diode is used as the temperature detection element D1 in the embodiment, but the temperature detection element D1 is not limited to this. For example, it suffices to measure a potential between the two terminals of a resistance element having a temperature characteristic, such as a resistance element using polysilicon or TaSiN.

Figure 3:
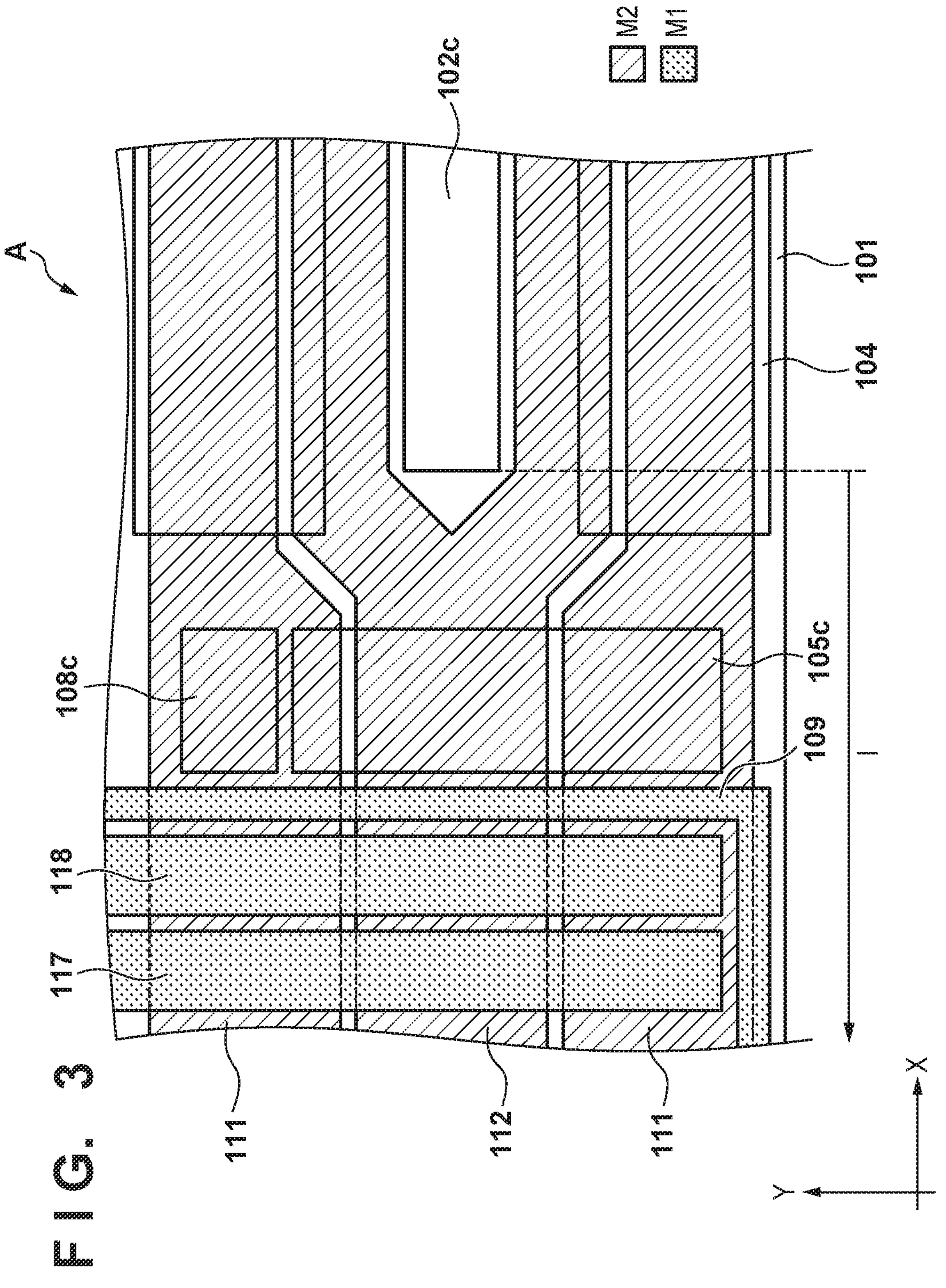
FIG. 3 is a top view showing an example of the arrangement of a wiring pattern in a region A on the liquid discharge head substrate in FIG. 1.

FIG. 3 is a top view showing an example of the arrangement of a wiring pattern in a region A surrounded by a broken line in FIG. 1. A wiring layer M1 performs wiring in the Y direction and a wiring layer M2 performs wiring in the X direction in a region I between the external connection terminal 106 and a region of the substrate 101 where the control circuits 105, the temperature detection units 108, the liquid supply ports 102, and the like are arranged.

In the region A, the temperature detection unit 108*c* and the control circuit 105 are arranged adjacent to each other. Power supply wiring patterns 111 and a ground wiring pattern 112 for the liquid discharge elements 123 are arranged using the wiring layer M2. To stabilize the characteristics of the liquid discharge elements 123, the power supply wiring pattern 111 and the ground wiring pattern 112 need to connect the external connection terminals 106 and the liquid discharge elements 123 at low resistance. For this purpose, the power supply wiring pattern 111 and the ground wiring pattern 112 can be arranged with wiring widths as maximum as possible. In the embodiment, the driving wiring pattern 109 is laid out to extend in the Y direction in the wiring layer M1 different from the wiring layer M2 in which the power supply wiring pattern 111 and the ground wiring pattern 112 for the liquid discharge elements 123 are arranged. Further, the driving wiring pattern 109 extends in the X direction in the wiring layer M1 at an end portion of the substrate 101 in the Y direction. The driving wiring pattern 109 is connected to the external connection terminal 106*a* so as to run round a power supply wiring pattern 117 and a ground wiring pattern 118 for the control circuits 105 that are arranged in the wiring layer M1 at an end portion of the substrate 101 on the side of the external connection terminals 106 in the X direction.

In the embodiment, the driving wiring pattern 109 for driving the temperature detection elements D1 of the temperature detection units 108 is extracted collectively in the Y direction, laid out in the X direction at an end portion of the substrate 101 in the Y direction, and connected to the external connection terminal 106*a*. As a result, in the region I between the liquid supply ports 102 and the external connection terminals 106, the driving wiring pattern 109 is extracted up to an end portion of the substrate 101 in the Y direction while avoiding the wiring region of the power supply wiring pattern 117 and ground wiring pattern 118 for the liquid discharge elements 123 that extend in the X direction in the wiring layer M2. In the region I, the driving wiring pattern 109 is extracted up to an end portion of the substrate 101 in the Y direction while avoiding the wiring region of the power supply wiring pattern 117 and ground wiring pattern 118 for the control circuits 105 that extend in the Y direction in the wiring layer M1. Further, the driving wiring pattern 109 can be laid out in the X direction using a region that may serve as a redundant space at an end portion of the substrate 101 in the Y direction. Thus, regions for driving wiring patterns extending in the X direction up to the external connection terminals 106 need not be ensured for the temperature detection elements D1 provided for the respective liquid supply ports 102. Hence, the wiring region of the power supply wiring pattern 111 and ground wiring pattern 112 for the liquid discharge elements 123 can be widened.

In this manner, the driving wiring pattern 109 is shared between the plurality of temperature detection elements D1 arranged on the substrate 101. The wiring efficiency of the power supply wiring pattern 111 and ground wiring pattern 112 for the liquid discharge elements 123 can be increased in comparison with a case in which lead wires are provided for the external connection terminals 106 from the respective temperature detection elements D1 arranged in the temperature detection units 108 that are arranged in correspondence with the respective liquid supply ports 102. Also, the wiring efficiency of the power supply wiring pattern 117 and ground wiring pattern 118 for the control circuits 105 can be increased. More specifically, the driving wiring pattern 109 is shared between the plurality of temperature detection elements D1, so the wiring regions of wiring patterns connected to other elements such as the liquid discharge elements 123 and the control circuits 105 are not narrowed, and an increase in wiring resistance can be suppressed. The suppression of an increase in the wiring resistance of the power supply wiring pattern 111 and ground wiring pattern 112 connected to the liquid discharge elements 123 leads to suppression of degradation of the characteristics of a liquid discharge head using the liquid discharge head substrate 100. By measuring the temperature of the substrate 101 of the liquid discharge head substrate 100 at a plurality of locations, finer control can be performed with respect to a change in the characteristics of the liquid discharge elements 123 by the temperature. This can improve the characteristics of the liquid discharge head using the liquid discharge head substrate 100.

Figure 4:
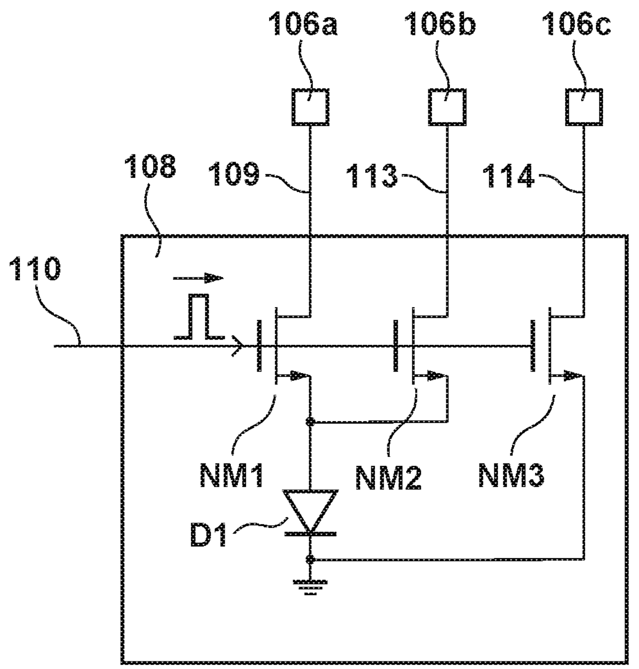
FIG. 4 is an equivalent circuit diagram showing a modification of the temperature detection unit in FIG. 2.

FIG. 4 is an equivalent circuit diagram showing a modification of the temperature detection unit 108 shown in FIG. 2. Monitoring wiring patterns 113 and 114 may be connected via switching elements NM2 and NM3 to two terminals of the temperature detection element D1 arranged in the temperature detection unit 108. In the arrangement shown in FIG. 4, the monitoring wiring pattern 113 is connected to the anode terminal of the temperature detection element D1 via the switching element NM2. The monitoring wiring pattern 113 is connected to an external connection terminal 106*b*. The monitoring wiring pattern 114 is connected to the cathode terminal of the temperature detection element D1 via the switching element NM3. The monitoring wiring pattern 114 is connected to an external connection terminal 106*c*. FIG. 4 shows an example in which NMOS transistors are used as the switching elements NM2 and NM3, similar to the switching element NM1. The gate terminals of the switching elements NM1 to NM3 are connected to the common control wiring pattern 110. The switching elements NM1 to NM3 are turned on or off at the same timing.

In the arrangement shown in FIG. 2, for example, the measurement voltage value of the temperature detection element D1 needs to be corrected for each temperature detection unit 108 by using a correction table or the like in accordance with a wiring resistance value from the external connection terminal 106*a*. Similarly, the measurement voltage value of the temperature detection element D1 needs to be corrected for each temperature detection unit 108 in consideration of the ON resistance value of the switching element NM1 at the time of the ON operation, the temperature characteristic for the ON resistance value, and the like.

In contrast, the arrangement shown in FIG. 4 is used to enable so-called four-terminal sensing of independently measuring a current flowing through the temperature detection element D1 and a potential applied to the temperature detection element D1. The current and potential of the temperature detection element D1 can be measured without considering a difference in potential arising from nonuniformity of resistance values from the external connection terminal 106*a* to the respective temperature detection elements D1 that is generated by connecting the plurality of temperature detection elements D1 to one driving wiring pattern 109. This can improve the precision of temperature measurement of the substrate 101 of the liquid discharge head substrate 100.

Although FIG. 4 shows an arrangement for one temperature detection unit 108, each of the temperature detection units 108*a* to 108*c* shown in FIG. 2 may have a similar arrangement. In this case, the monitoring wiring patterns 113 and 114 may be shared between the plurality of temperature detection units 108 (temperature detection elements D1), similar to the driving wiring pattern 109. The monitoring wiring patterns 113 and 114 may be arranged in, for example, the wiring layer M1 in parallel with the driving wiring pattern 109. The control wiring patterns 110 may be separately connected to the external connection terminals 106 and 107 for the respective temperature detection units 108. However, when the number of temperature detection units 108 is large and the external connection terminals 106 and 107 are separately prepared for the respective temperature detection units 108, a larger number of external connection terminals 106 and 107 become necessary. In addition, a large number of control wiring patterns 110 are arranged. To prevent this, for example, the control circuit 105 may control the switching elements NM1 to NM3 of the temperature detection units 108. This can suppress the numbers of external connection terminals 106 and 107 and a region where the control wiring patterns 110 are arranged. That is, this can improve the wiring efficiencies of the power supply wiring pattern 111 and ground wiring pattern 112 for the liquid discharge elements 123 and the power supply wiring pattern 117 and ground wiring pattern 118 for the control circuits 105.

Figure 5:
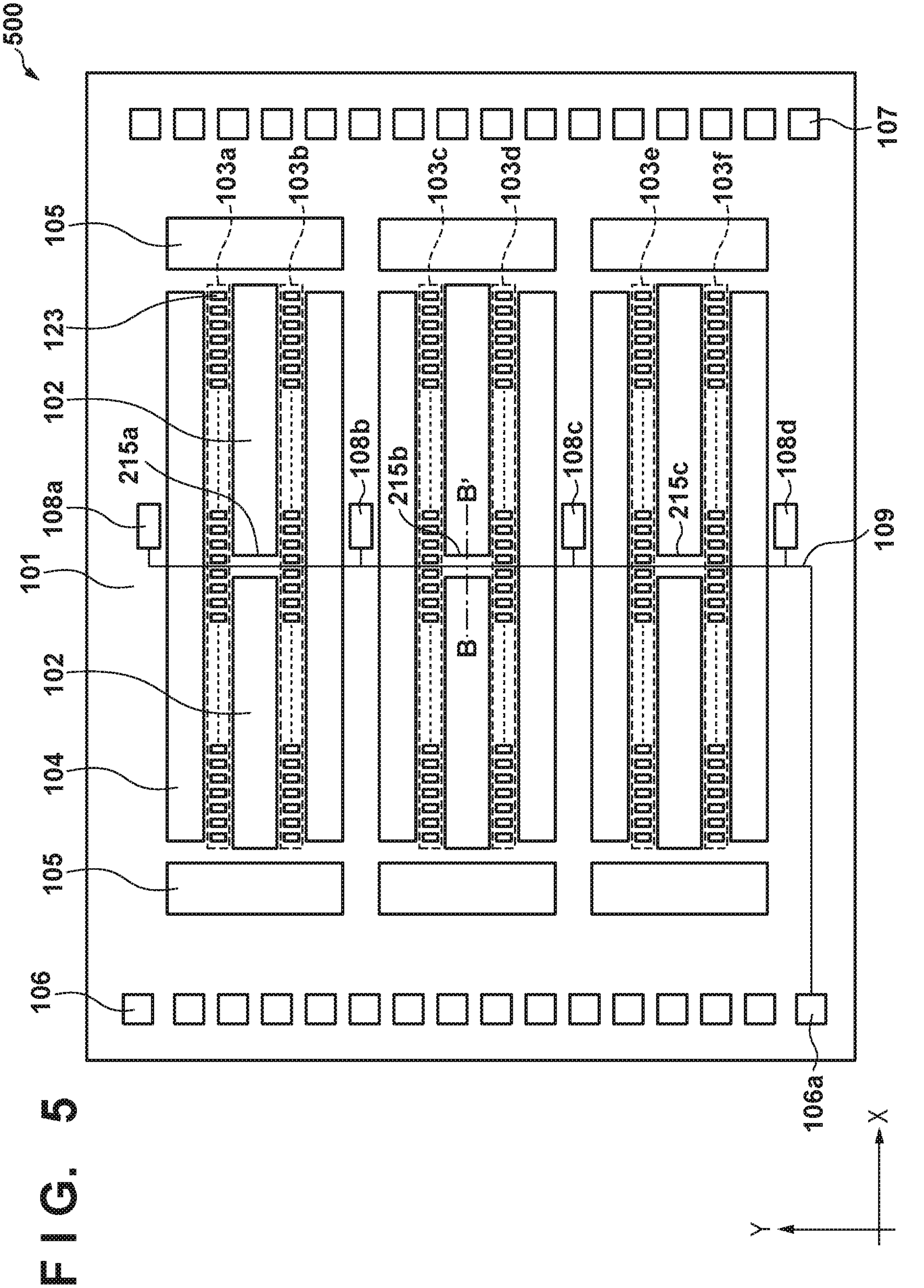
FIG. 5 is a schematic plan view showing a modification of the liquid discharge head substrate in FIG. 1.

FIG. 5 is a schematic plan view showing an example of the arrangement of a liquid discharge head substrate 500 as a modification of the liquid discharge head substrate 100 shown in FIG. 1. The liquid discharge head substrate 500 shown in FIG. 5 is configured to obtain a temperature near the center of the liquid discharge element array 103 in which the plurality of liquid discharge elements 123 are aligned in the X direction. Temperature detection units 108*a* to 108*d* each including the temperature detection element D1 are arranged near the center of the substrate 101 in the X direction so that the temperature detection units 108*a* to 108*d* are spaced apart from each other in the Y direction. The temperature detection unit 108*a* is arranged between a liquid discharge element array 103*a* and one end portion (one long side extending in the X direction) of the substrate 101 in the Y direction. The temperature detection unit 108*b* is arranged between liquid discharge element arrays 103*b* and 103*c*. The temperature detection unit 108*c* is arranged between liquid discharge element arrays 103*d* and 103*e*. The temperature detection unit 108*d* is arranged between a liquid discharge element array 103*f* and the other end portion (the other long side extending in the X direction) of the substrate 101 in the Y direction.

For example, the discharge ability of the liquid discharge element 123 of the liquid discharge element array 103*a* may be adjusted based on the measurement result of the temperature detection element D1 of the temperature detection unit 108*a*. Similarly, the discharge ability of the liquid discharge elements 123 of the liquid discharge element arrays 103*b* and 103*c* may be adjusted based on the measurement result of the temperature detection element D1 of the temperature detection unit 108*b*. The discharge ability of the liquid discharge elements 123 of the liquid discharge element arrays 103*d* and 103*e* may be adjusted based on the measurement result of the temperature detection element D1 of the temperature detection unit 108*c*. The discharge ability of the liquid discharge elements 123 of the liquid discharge element array 103*f* may be adjusted based on the measurement result of the temperature detection element D1 of the temperature detection unit 108*d*. However, the present disclosure is not limited to this, and it is sufficient to properly adjust the discharge ability of the liquid discharge elements 123 arranged in the liquid discharge element arrays 103*a* to 103*f* based on the measurement results of the temperature detection elements D1 arranged in the temperature detection units 108*a* to 108*d*.

In the arrangement shown in FIG. 5, beams 215 formed integrally with the substrate 101 are arranged at the liquid supply ports 102 in order to arrange the driving wiring pattern 109 in the Y direction at the center of the substrate 101 in the X direction. As a result, each liquid supply port 102 is divided into two at the center of the substrate 101 in the X direction. The liquid supply ports 102 may communicate below the beam 215. The arrangement of the temperature detection units 108 and an arrangement except the beams 215 through which the driving wiring pattern 109 runs may be similar to those of the above-described liquid discharge head substrate 100. Here, an arrangement of the liquid discharge head substrate 500 that is different from the liquid discharge head substrate 100 will be mainly explained, and a description of an arrangement that can be similar to the liquid discharge head substrate 100 will be properly omitted.

Figure 6:
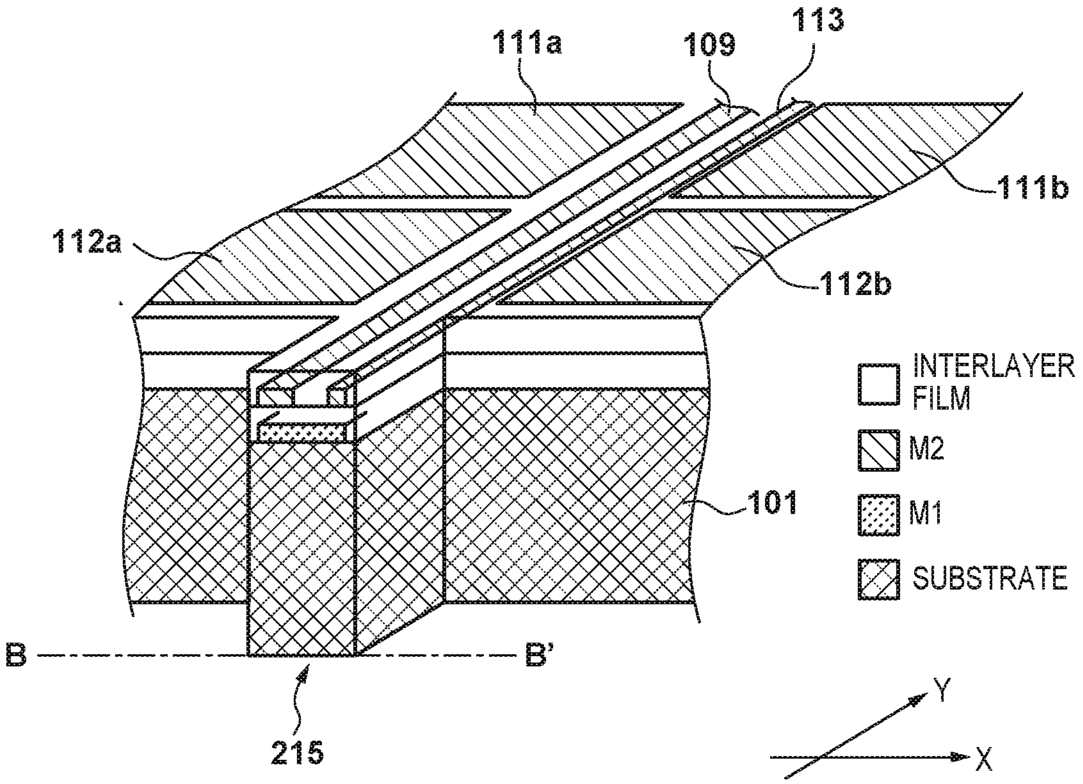
FIG. 6 is a perspective view showing a section of the liquid discharge head substrate between B-B' in FIG. 5.

FIG. 6 is a perspective view showing a section between B-B' in FIG. 5. Wiring layers including the wiring layers M1 and M2 are respectively formed on the substrate 101 together with interlayer films (interlayer insulation films). A similar layer structure is also formed at the beams 215 formed integrally with the substrate. The driving wiring pattern 109 extends in the Y direction using the wiring layer M2 formed on beams 215*a* to 215*c*. In a region where the driving wiring pattern 109 is sandwiched between the liquid discharge element arrays 103*b* and 103*c*, the driving wiring pattern 109 extends in the Y direction between the power supply wiring pattern 111 and the ground wiring pattern 112 for the liquid discharge elements 123 that extend in the X direction from the external connection terminals 106 and 107 arranged in the wiring layer M2. In this case, for example, of the power supply wiring patterns 111 and the ground wiring patterns 112, a power supply wiring pattern 111*a* and a ground wiring pattern 112*a* arranged between the external connection terminals 106 and the driving wiring pattern 109 can be connected to the external connection terminals 106. Similarly, of the power supply wiring patterns 111 and the ground wiring patterns 112, a power supply wiring pattern 111*b* and a ground wiring pattern 112*b* arranged between the driving wiring pattern 109 and the external connection terminals 107 may be connected to the external connection terminals 107. The above-mentioned monitoring wiring patterns 113 and 114 may be arranged along the driving wiring pattern 109 using the wiring layer M2. FIG. 6 shows a wiring pattern in which only the monitoring wiring pattern 113 is provided. The monitoring wiring pattern 114 can be omitted when the impedance of the ground wiring is designed to be low. Therefore, the monitoring wiring pattern 113 may be connected to one (for example, anode terminal) of two terminals of the temperature detection element D1.

In this manner, the driving wiring pattern 109 can be extracted up to an end portion of the substrate 101 in the Y direction while suppressing parallel arrangement of the power supply wiring pattern 111 and ground wiring pattern 112 for the liquid discharge elements 123 that extend from the external connection terminals 106 and 107 in the X direction. More specifically, of wiring patterns connected to the temperature detection units 108*a* to 108*d*, the driving wiring pattern 109 for which the wiring width especially needs to be large runs through the beams 215*a* to 215*c*. The driving wiring pattern 109 is thus shared between the temperature detection elements D1 of the plurality of temperature detection units 108 and extracted to an end portion of the substrate 101 in the Y direction. A region for the driving wiring pattern 109 extending in the X direction up to the external connection terminal 106 need not be ensured for each temperature detection unit 108 (temperature detection element D1). The widths of the power supply wiring pattern 111 and ground wiring pattern 112 for the liquid discharge elements 123 can be increased, increasing the wiring efficiency.

In the embodiment, the driving wiring pattern 109 is formed at the beams 215 provided at the center of the liquid supply port 102 by using the wiring layer M2, and wiring in the Y direction is performed while avoiding circuit elements arranged in an underlayer below the wiring layer of the driver circuit 104 and the like. To the contrary, the power supply wiring pattern 111 and ground wiring pattern 112 for the liquid discharge elements 123 that are connected to the external connection terminals 106 and 107 extend in the X direction up to the center of the liquid supply port 102. As described above, the power supply wiring pattern 111 and the ground wiring pattern 112 are divided into the power supply wiring pattern 111*a* and ground wiring pattern 112*a* connected to the external connection terminals 106, and the power supply wiring pattern 111*b* and ground wiring pattern 112*b* connected to the external connection terminals 107.

To avoid discharge nonuniformity arising from the impedance of the wiring pattern, the numbers of liquid discharge elements 123 respectively connected to the power supply wiring pattern 111 and the ground wiring pattern 112 may be substantially equal. The driving wiring pattern 109 extending in the Y direction runs through the beams 215 provided at the center of the substrate 101. Along with this, the power supply wiring patterns 111*a* and 111*b* and the ground wiring patterns 112*a* and 112*b* become substantially equal in length in the X direction. The numbers of liquid discharge elements 123 connected to the power supply wiring pattern 111*a* and ground wiring pattern 112*a* extending from the external connection terminals 106 and the power supply wiring pattern 111*b* and ground wiring pattern 112*b* extending from the external connection terminals 107 can be substantially equal without requiring any special wiring layer.

Even in the liquid discharge head substrate 500, similar to the above-described liquid discharge head substrate 100, the wiring regions of the wiring patterns connected to the liquid discharge elements 123 are not narrowed, and an increase in wiring resistance can be suppressed. This suppresses degradation of the characteristics of the liquid discharge head using the liquid discharge head substrate 500. By measuring the temperature of the substrate 101 of the liquid discharge head substrate 500 at a plurality of locations, finer control can be performed with respect to a change in the characteristics of the liquid discharge elements 123 by the temperature.

Figure 7:
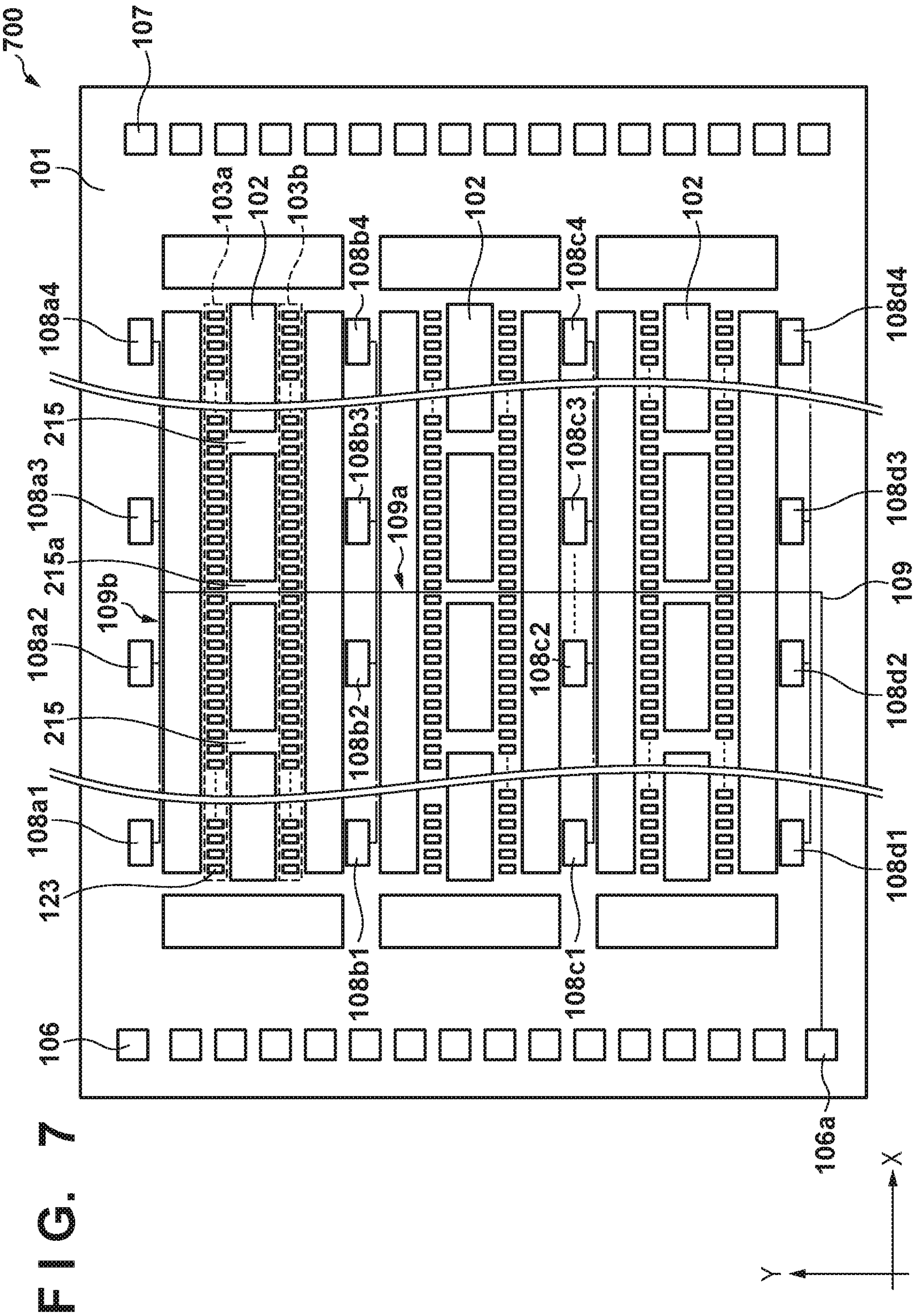
FIG. 7 is a schematic plan view showing a modification of the liquid discharge head substrate in FIG. 1.

FIG. 7 is a schematic plan view showing an example of the arrangement of a liquid discharge head substrate 700 as a modification of the liquid discharge head substrate 100 shown in FIG. 1 and the liquid discharge head substrate 500 shown in FIG. 5. In the above-described liquid discharge head substrates 100 and 500, the plurality of temperature detection units 108 (temperature detection elements D1) are spaced apart from each other in the Y direction. However, the present disclosure is not limited to this arrangement. An arrangement of the liquid discharge head substrate 700 that is different from the liquid discharge head substrates 100 and 500 will be mainly explained.

In the arrangement shown in FIG. 7, a plurality of beams 215 formed integrally with the substrate 101 are arranged at the liquid supply ports 102 extending in the X direction. The driving wiring pattern 109 runs through beams 215*a* out of the plurality of beams 215.

The temperature detection units 108 include not only the temperature detection units 108 (for example, temperature detection units 108*a*1 and 108*b*1) spaced apart from each other in the Y direction, as in the liquid discharge head substrates 100 and 500, but also the temperature detection units 108 (for example, the temperature detection unit 108*a*1 and a temperature detection unit 108*a*2) spaced apart from each other in the X direction. In this case, the respective temperature detection elements D1 arranged in the temperature detection units 108 spaced apart in the X direction may be connected to an extending portion 109*a* of the driving wiring pattern 109 that extends in the Y direction. In this case, however, the driving wiring pattern 109 extending in the X direction becomes necessary for each of the temperature detection units 108 spaced apart from each other in the X direction, suppressing a region where the power supply wiring pattern 111 and ground wiring pattern 112 for the liquid discharge elements 123 are arranged. One extending portion 109*a* of the driving wiring pattern 109 that extends in the Y direction means a portion of the driving wiring pattern 109 that extends continuously in the Y direction and does not include a portion substantially extending in the X direction.

As shown in FIG. 7, the plurality of temperature detection elements D1 (for example, the temperature detection elements $D1_o$ arranged in the temperature detection unit 108*a*1 to a temperature detection unit 108*a*4) spaced apart from each other in the Y direction may be connected to the extending portion 109*a* via an extending portion 109*b* of the driving wiring pattern 109 that extends in the X direction. The extending portion 109*b* of the driving wiring pattern 109 that extends in the X direction means a portion of the driving wiring pattern 109 that extends continuously in the X direction and does not include a portion substantially extending in the Y direction.

The power supply wiring pattern 111 and ground wiring pattern 112 for the liquid discharge elements 123 are arranged from the external connection terminals 106 and 107 toward the center of the substrate 101 in the X direction in which the liquid discharge element arrays 103 are aligned. When many liquid discharge elements 123 are simultaneously operated, a flowing current amount can increase in the liquid discharge elements 123 closer to the external connection terminals 106 and 107. In a region from the ends of the liquid discharge element arrays 103 to the external connection terminals 106, wiring widths necessary for the power supply wiring pattern 111 and ground wiring pattern 112 for the liquid discharge elements 123 can be increased. Also in the arrangement shown in FIG. 7, the driving wiring pattern 109 is arranged in the Y direction through the beams 215 arranged near the centers of the liquid discharge element arrays 103 without running through ends of the liquid discharge element arrays 103 in the X direction with respect to the temperature detection units 108 spaced apart in the Y direction. Further, the temperature detection units 108 spaced apart from each other in the X direction are connected to one extending portion 109*b* of the driving wiring pattern 109 that extends in the X direction. The driving wiring pattern 109 can be extracted up to the external connection terminal 106 by using a prospective redundant region at an end portion of the substrate 101 in the Y direction, similar to the above-described liquid discharge head substrates 100 and 500. Even in the liquid discharge head substrate 700 shown in FIG. 7, the wiring widths of the power supply wiring pattern 111 and ground wiring pattern 112 for the liquid discharge elements 123 can be increased, increasing the wiring efficiency. That is, even in the liquid discharge head substrate 700, similar to the above-described liquid discharge head substrates 100 and 500, the wiring regions of the wiring patterns connected to the liquid discharge elements 123 are not narrowed, and an increase in wiring resistance can be suppressed. This suppresses degradation of the characteristics of the liquid discharge head using the liquid discharge head substrate 700. By measuring the temperature of the substrate 101 of the liquid discharge head substrate 700 at a plurality of locations, finer control can be performed with respect to a change in the characteristics of the liquid discharge elements 123 by the temperature.

Figure 8:
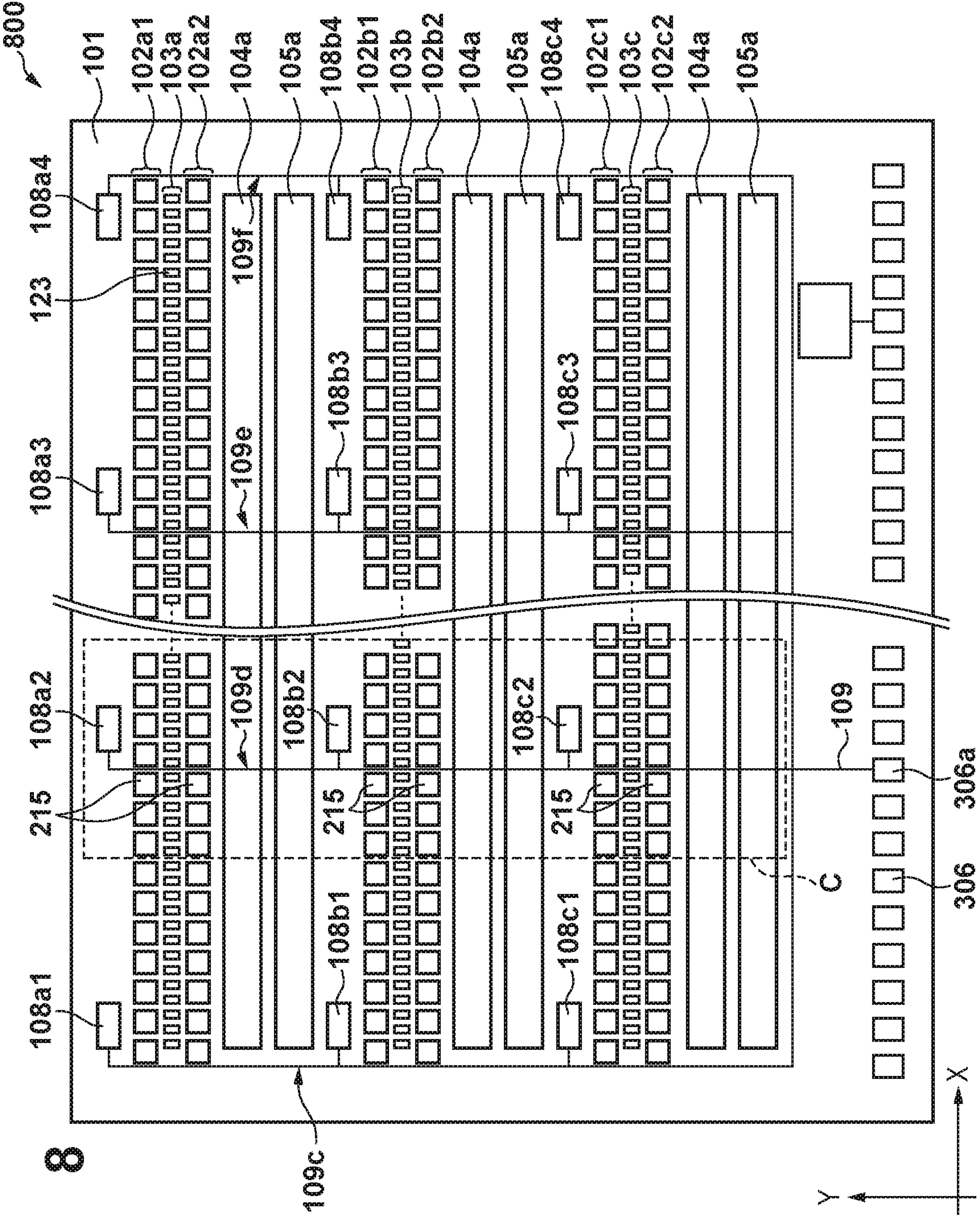
FIG. 8 is a schematic plan view showing a modification of the liquid discharge head substrate in FIG. 1.

FIG. 8 is a schematic plan view showing an example of the arrangement of a liquid discharge head substrate 800 as a modification of the above-described liquid discharge head substrates 100, 500, and 700. In the liquid discharge head substrates 100, 500, and 700, the respective temperature detection elements D1 arranged in the plurality of temperature detection units 108 are connected to one extending portion 109*a* of the driving wiring pattern 109 that extends in the Y direction. However, the present disclosure is not limited to this. An arrangement of the liquid discharge head substrate 800 that is different from the liquid discharge head substrates 100, 500, and 700 will be mainly explained.

In the above-described liquid discharge head substrates 100, 500, and 700, the external connection terminals 106 and 107 are arranged in the Y direction at two ends of the substrate 101 in the X direction serving as a longitudinal direction. In contrast, in the liquid discharge head substrate 800 shown in FIG. 8, external connection terminals 306 are arranged in the X direction at one end of the substrate 101 in the Y direction serving as a widthwise direction.

The liquid supply ports 102 of two arrays are provided for one liquid discharge element array 103. For example, liquid supply ports 102*a*1 and 102*a*2 spaced apart from each other in the Y direction are arranged for the liquid discharge element array 103*a*. The liquid supply port 102 is divided by the beams 215 into a plurality of openings passing through the substrate 101.

In the arrangement shown in FIG. 8, the three liquid discharge element arrays 103*a* to 103*c* formed from the plurality of liquid discharge elements 123 aligned in the X direction are arranged on the substrate 101. The plurality of temperature detection units 108*a*1 to 108*a*4 each including the temperature detection element D1 are arranged in correspondence with the liquid discharge element array 103*a*. Similarly, pluralities of temperature detection units 108*b*1 to 108*b*4 and 108*c*1 to 108*c*4 each including the temperature detection element D1 are arranged in correspondence with the liquid discharge element arrays 103*b* and 103*c*.

Also in the arrangement shown in FIG. 8, the control circuit 105 for controlling the driver circuit 104 and the temperature detection units 108 is arranged adjacent to the driver circuit 104. The control circuit 105*a* can be arranged in correspondence with a driver circuit 104*a* and the temperature detection units 108*a*1 to 108*a*4. Similarly, the control circuits 105*b* and 105*c* can be arranged in correspondence with driver circuits 104*b* and 104*c* and the temperature detection units 108*b*1 to 108*b*4 and 108*c*1 to 108*c*4.

Of the temperature detection units 108, the temperature detection units 108*a*1, 108*b*1, and 108*c*1 that are arranged at substantially the same position in the X direction and spaced apart from each other in the Y direction are connected to an extending portion 109*c* of the driving wiring pattern 109 that extends in the Y direction. Of the temperature detection units 108, the temperature detection units 108*a*2, 108*b*2, and 108*c*2 that are arranged at substantially the same position in the X direction and spaced apart from each other in the Y direction are connected to an extending portion 109*d* of the driving wiring pattern 109 that extends in the Y direction. Of the temperature detection units 108, the temperature detection units 108*a*3, 108*b*3, and 108*c*3 that are arranged at substantially the same position in the X direction and spaced apart from each other in the Y direction are connected to an extending portion 109*e* of the driving wiring pattern 109 that extends in the Y direction. Of the temperature detection units 108, the temperature detection units 108*a*4, 108*b*4, and 108*c*4 that are arranged at substantially the same position in the X direction and spaced apart from each other in the Y direction are connected to an extending portion 109*f* of the driving wiring pattern 109 that extends in the Y direction. The extending portions 109*c* to 109*f* of the driving wiring pattern 109 are connected by a portion of the driving wiring pattern 109 that extends in the X direction. Of the temperature detection elements D1 respectively arranged in the plurality of temperature detection units 108, temperature detection elements (for example, temperature detection elements D10 respectively arranged in the temperature detection units 108*a*1, 108*b*1, and 108*c*1) that are arranged at substantially the same position in the X direction and spaced apart in the Y direction are connected to one extending portion (for example, an extending portion 109*c*0) of the driving wiring pattern 109 that extends in the Y direction. Of the temperature detection elements D1 respectively arranged in the temperature detection units 108, temperature detection elements (for example, temperature detection elements D10 respectively arranged in the temperature detection units 108*a*1, 108*a*2, 108*a*3, and 108*a*4) spaced apart from each other in the X direction are connected to the different extending portions (for example, the extending portions 109*c*, 109*d*, 109*e*, and 109*f*0) of the driving wiring pattern 109 that extend in the Y direction.

The beams 215 provided at the liquid supply ports 102 are regions between the openings of the liquid supply ports 102 that are densely arranged in the X direction and pass through the substrate 101. In other words, a region between the liquid supply ports 102 (for example, between the liquid supply ports 102*a*1 and 102*a*2) that are spaced apart in the Y direction to supply a liquid to one liquid discharge element array 103 is not the beam 215. Similarly, a region between the liquid supply ports 102 (for example, between the liquid supply ports 102*a*2 and 102*b*1) that supply a liquid to the different liquid discharge element arrays 103 is not the beam 215.

Figure 9:
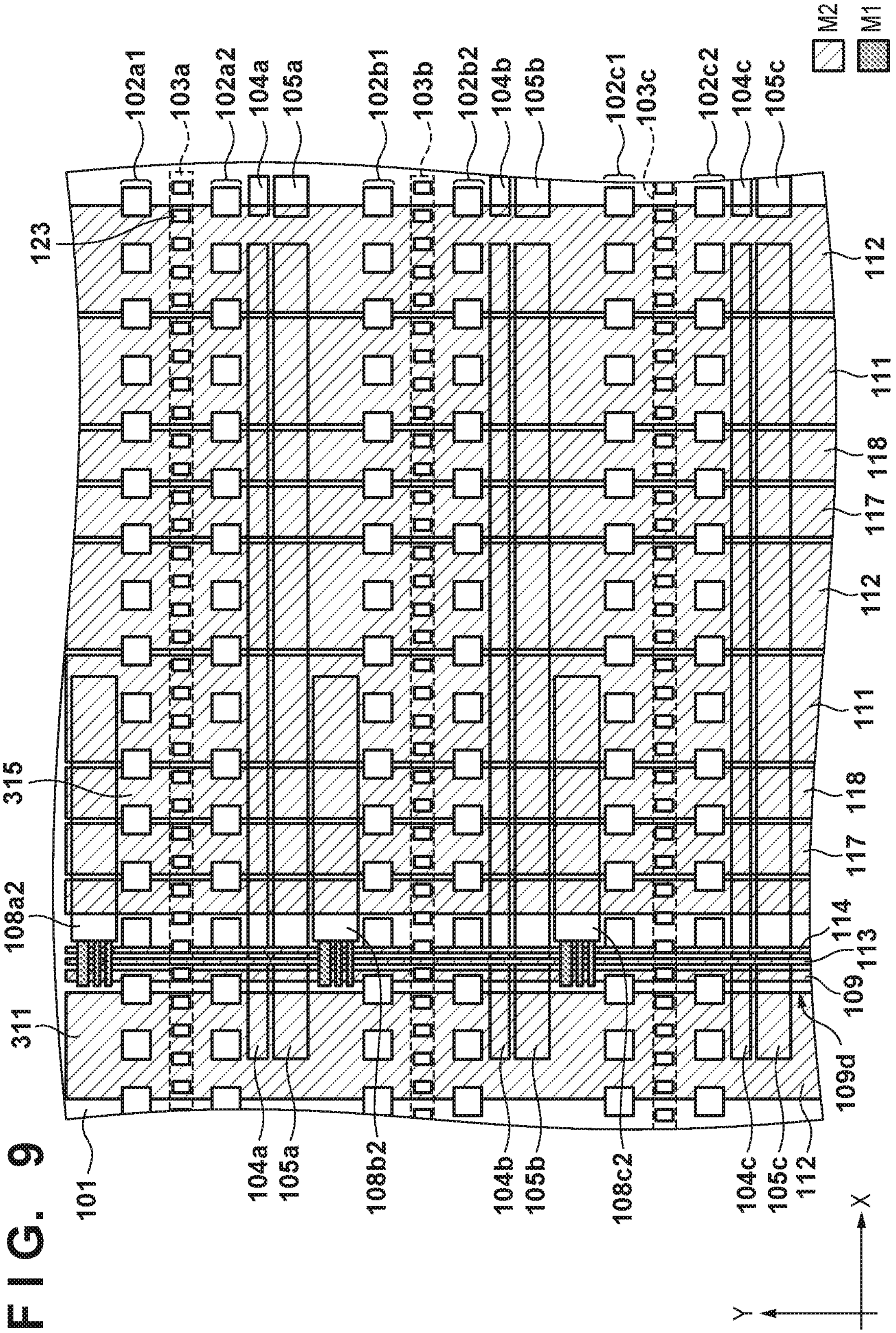
FIG. 9 is a view showing an example of the arrangement of a wiring pattern in a region C on the liquid discharge head substrate in FIG. 8.

FIG. 9 is a view showing an example of the arrangement of a wiring pattern in the Y direction in a region C surrounded by a dotted line in FIG. 8. As shown in FIG. 8, the substrate 101 includes the external connection terminals 306 on the lower side in FIG. 9. The power supply wiring patterns 111 and ground wiring patterns 112 for the liquid discharge elements 123 are formed to run through the beams 215 and extend in the Y direction by using the wiring layer M2 together with the power supply wiring patterns 117 and ground wiring patterns 118 for the control circuits 105. The power supply wiring patterns 111 and 117 and the ground wiring patterns 112 and 118 reach an end portion of the substrate 101 in the Y direction on a side opposite to the external connection terminals 306. These wiring patterns are connected through conductive members arranged via the wiring layer M1 at a plurality of portions in the substrate 101, and extend in the X direction in the wiring layer M1, forming a mesh-like power supply plane. To prevent an increase in the wiring resistances of the power supply wiring patterns 111 and ground wiring patterns 112 while arranging many temperature detection units 108, it is effective to reduce a wiring area necessary for the driving wiring pattern 109 of the temperature detection units 108.

As shown in FIG. 9, the temperature detection elements D1 arranged in the plurality of temperature detection units 108 (temperature detection units 108*a*2, 108*b*2, and 108*c*2) aligned in the Y direction share one extending portion (extending portion 109*d*) of the driving wiring pattern 109 that extends in the Y direction. Compared to a case in which the driving wiring pattern 109 is individually connected to the temperature detection element D1, a region necessary for the driving wiring pattern 109 can be suppressed, and as a result the wiring efficiencies of the power supply wiring patterns 111 and 117 and ground wiring patterns 112 and 118 can be increased. Even in the liquid discharge head substrate 800, similar to the above-described liquid discharge head substrates 100, 500, and 700, the wiring regions of the wiring patterns connected to the liquid discharge elements 123 are not narrowed, and an increase in wiring resistance can be suppressed. As a result, this suppresses degradation of the characteristics of the liquid discharge head using the liquid discharge head substrate 800. By measuring the temperature of the substrate 101 of the liquid discharge head substrate 800 at a plurality of locations, finer control can be performed with respect to a change in the characteristics of the liquid discharge elements 123 by the temperature.

In the liquid discharge head substrate 800, the substrate 101 is often configured to be long in the X direction in terms of increasing the width by which printing is possible at once, in other words, the width of the liquid discharge element array 103. That is, extracting the driving wiring pattern 109 of the temperature detection elements D1 in the X direction leads to an increase in the area of the driving wiring pattern 109. When the driving wiring pattern 109 is arranged in the Y direction through the plurality of beams 215 provided at the liquid supply ports 102 as in the arrangement shown in FIGS. 8 and 9, a portion of the driving wiring pattern 109 that extends in the X direction can be reduced in comparison with, for example, the arrangement shown in FIG. 7. Hence, the liquid discharge head substrate 800 shown in FIGS. 8 and 9 can reduce an area necessary for the driving wiring pattern 109 in the entire substrate 101. The monitoring wiring patterns 113 and 114 can also be connected to the temperature detection elements D1 respectively arranged in the plurality of temperature detection units 108 by using an arrangement similar to that of the driving wiring pattern 109. Even in FIG. 9, the monitoring wiring patterns 113 and 114 are arranged parallel to the driving wiring pattern 109.

Figure 10:
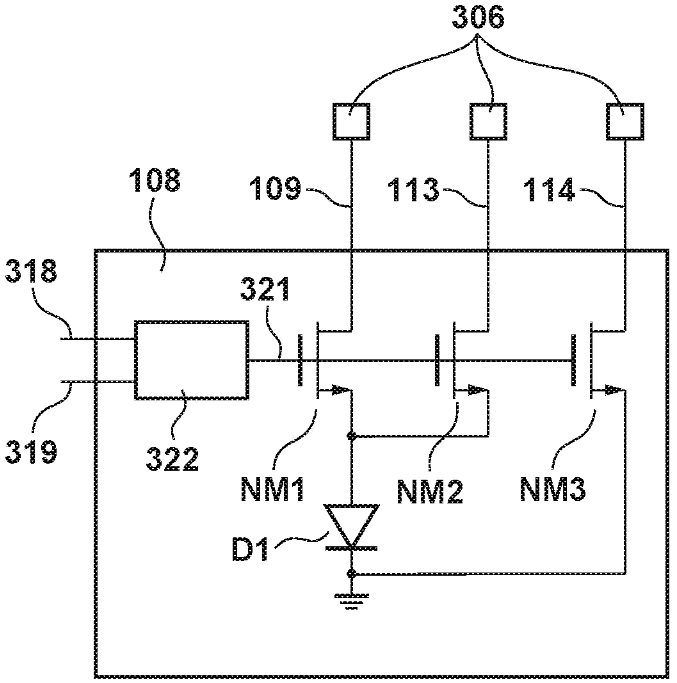
FIG. 10 is an equivalent circuit diagram showing an example of the arrangement of the temperature detection unit of the liquid discharge head substrate in FIG. 8.

FIG. 10 is an equivalent circuit diagram showing an example of the connection relationship between the temperature detection unit 108 and the driving wiring pattern 109 in the liquid discharge head substrate 800. In the temperature detection unit 108, an output from a decoding unit 322 is commonly input to the switching elements NM1, NM2, and NM3 via a wiring pattern 321. The decoding unit 322 receives inputs from a control wiring pattern 318 for selecting the temperature detection units 108 aligned in the X direction out of the temperature detection units 108, and a control wiring pattern 319 for selecting the temperature detection units 108 aligned in the Y direction, and generates a control signal. The decoding unit 322 can be constituted using, for example, a combinational circuit such as an AND circuit. In the temperature detection unit 108 shown in FIG. 10, an arrangement other than that regarding the decoding unit 322 may be similar to the temperature detection unit 108 shown in FIG. 4 described above, and a description of the arrangement that may be similar will be properly omitted.

Figure 11:
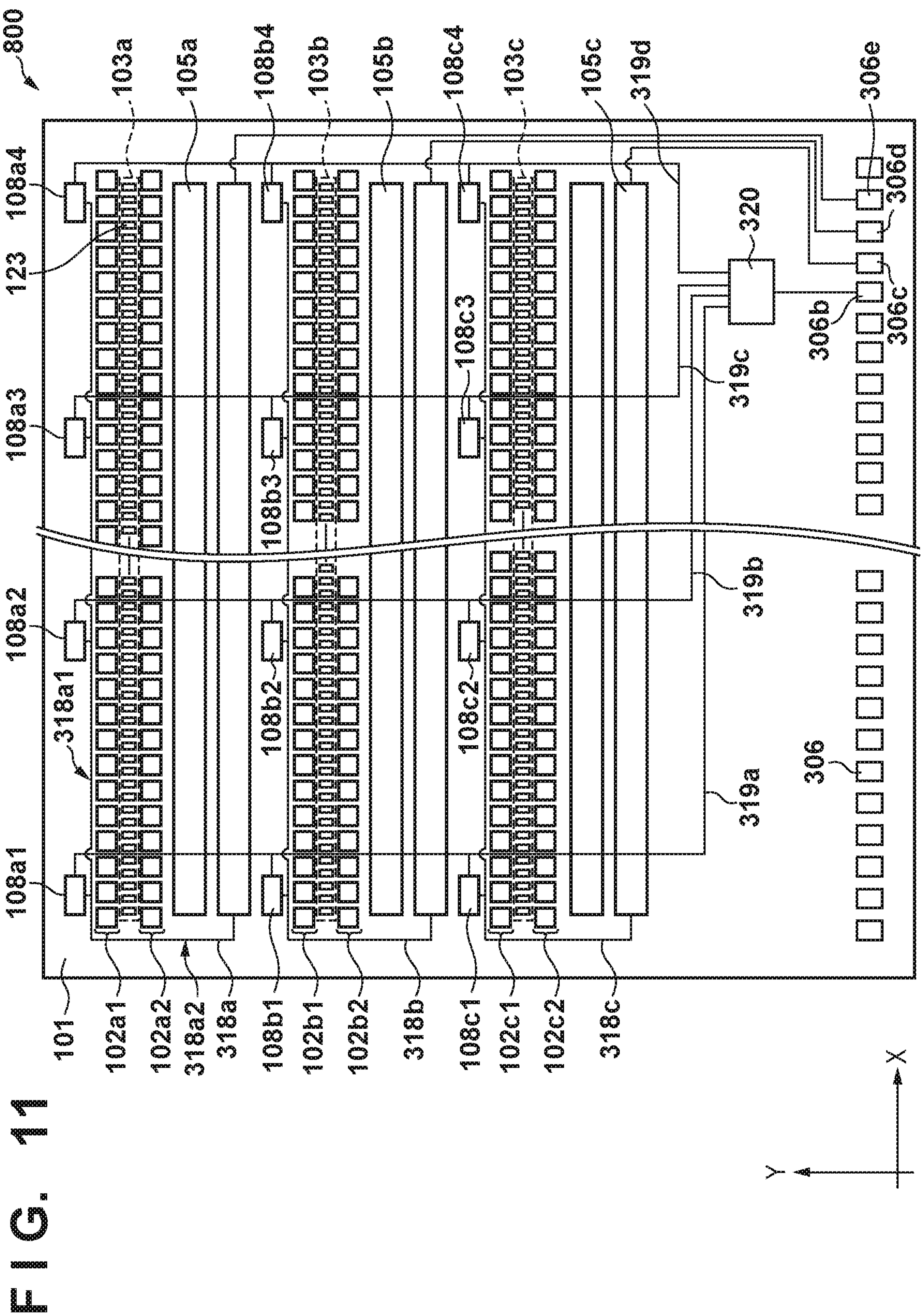
FIG. 11 is a schematic plan view showing an example of the arrangement of the control wiring pattern of the liquid discharge head substrate in FIG. 8.

FIG. 11 is a schematic plan view showing an example of the arrangement of the control wiring patterns 318 and 319 of the liquid discharge head substrate 800. The arrangement of the liquid supply ports 102, liquid discharge element arrays 103, driving wiring pattern 109, and the like is similar to the arrangement described above with reference to FIGS. 8 and 9.

In the embodiment, the control circuit 105 has the function of a heater logic circuit for supplying a control signal to the driver circuit 104 that drives the respective liquid discharge elements 123 arranged in the liquid discharge element array 103, and the function of the column control circuit of the temperature detection unit 108. The control circuit 105*a* controls, via a control wiring pattern 318*a* in accordance with a signal input from an external connection terminal 306*c*, activation/non-activation of the temperature detection units 108*a*1 to 108*a*4 aligned and spaced apart in the column direction. The control circuit 105*b* controls, via a control wiring pattern 318*b* in accordance with a signal input from an external connection terminal 306*d*, activation/non-activation of the temperature detection units 108*b*1 to 108*b*4 aligned and spaced apart in the column direction. The control circuit 105*c* controls, via a control wiring pattern 318*c* in accordance with a signal input from an external connection terminal 306*e*, activation/non-activation of the temperature detection units 108*c*1 to 108*c*4 aligned and spaced apart in the column direction.

A control circuit 320 is connected to control wiring patterns 319*a* to 319*d* and controls, in accordance with an input from an external connection terminal 306*b*, activation/non-activation of the temperature detection units 108 aligned and spaced apart in the row direction. The control circuits 105 and 320 include one or more circuits to control, separately for the row and the column, the plurality of temperature detection units 108 (temperature detection elements D1) respectively provided along the liquid discharge element arrays 103, and exclusively connect the temperature detection elements D1 to the driving wiring pattern 109.

In the liquid discharge head substrate 800, the beams 215 through which the driving wiring pattern 109 runs, and the beams 215 through which the driving wiring pattern 109 does not run are arranged. As the beams 215 through which the control wiring pattern 319 runs, the beams 215 different from the beams 215 through which the driving wiring pattern 109 and the monitoring wiring patterns 113 and 114 run can be used. Even when a logical signal flowing through the control wiring pattern 319 is frequently switched to perform measurement, the influence of switching noise on the driving wiring pattern 109 and the monitoring wiring patterns 113 and 114 can be suppressed. As a result, an output from the temperature detection unit 108 can be monitored at high precision.

By selecting temperature detection elements using the control wiring patterns 318 extending in the X direction, the number of control wiring patterns 318 extending in the Y direction can be suppressed in comparison with a case in which all the control wiring patterns 318 extend in the Y direction. More specifically, this will be explained by exemplifying the control circuit 105*a* that controls the switching elements NM1 arranged between the control wiring pattern 318*a* and the temperature detection elements D1 arranged in the temperature detection units 108*a*1 to 108*a*4 aligned and spaced apart in the X direction. With the above-described arrangement, the control circuit 105 turns on or off, at the same timing as that of the switching element NM1, the switching elements NM2 and NM3 arranged in the same temperature detection unit 108 as that of the switching element NM1. In this case, when the control wiring patterns 318 are arranged individually for the respective temperature detection units 108*a*1 to 108*a*4, the number of control wiring patterns 318 extending in the Y direction is four. To the contrary, as shown in FIG. 11, the switching elements NM1 arranged between the control wiring pattern 318*a* and the temperature detection elements D1 arranged in the temperature detection units 108*a*1 to 108*a*4 are connected to an extending portion 318*a*1 extending in the X direction out of the control wiring pattern 318*a* for respectively selecting the switching elements NM1 (and the switching elements NM2 and NM3) arranged in the temperature detection units 108*a*1 to 108*a*4. The control wiring pattern 318*a* thus includes an extending portion 318*a*2 as a portion extending parallel to the liquid supply ports 102*a*1 and 102*a*2 and the liquid discharge element array 103*a* constituted by the plurality of liquid discharge elements 123 in the Y direction. The liquid supply ports 102*a*1 and 102*a*2 that supply a liquid to the liquid discharge element array 103*a* are spaced apart in the Y direction with respect to the liquid discharge element array 103*a*.

The dimensions of the substrate 101 of the liquid discharge head substrate 800 are restricted more in the Y direction than in the X direction under restrictions such as the interval of the liquid discharge elements 123 and the like. Therefore, the arrangement shown in FIG. 11 can suppress the number of control wiring patterns 318 extending in the Y direction. As a result, this can increase the wiring efficiencies of the power supply wiring patterns 111 and 117 and ground wiring patterns 112 and 118 extending in the Y direction.

The temperature detection elements D1 arranged in the temperature detection units 108 are controlled using the control wiring patterns 318 extending mainly in the X direction and the control wiring patterns 319 extending mainly in the Y direction. The numbers of control wiring patterns 318 and 319 necessary to control the temperature detection units 108 can be minimized. That is, the areas of regions necessary for the control wiring patterns 318 and 319 can be reduced, increasing the wiring efficiencies of the power supply wiring patterns 111 and 117 and ground wiring patterns 112 and 118.

As shown in FIG. 11, a logical signal flowing through the control wiring pattern 318 is controlled using the control circuit 105. In this manner, the control circuit 105 has the function of a heater logic circuit for driving the liquid discharge elements 123 via the driver circuits 104, and the function of the column control circuit of the temperature detection unit 108. This arrangement enables sharing a data input between the heater logic circuit and the column control circuit of the temperature detection unit 108. Thus, the number of external connection terminals 306 can be reduced.

In the liquid discharge head substrate 800, the liquid supply ports 102 and the liquid discharge element arrays 103 are arranged between the temperature detection units 108 and the driver circuits 104. For example, the liquid discharge element array 103*a* and the liquid supply ports 102*a*1 and 102*a*2 are arranged between the driver circuit 104*a* that drives the liquid discharge element array 103*a* constituted by the liquid discharge elements 123 under the control of the control circuit 105*a*, and the temperature detection units 108*a*1 to 108*a*4 which are controlled by the control circuit 105*a* and includes the temperature detection elements D1. In terms of reducing the parasitic resistance, the driver circuit 104 can be arranged as closest to the liquid discharge element array 103 as possible. The temperature detection unit 108 (temperature detection element D1) needs to measure a temperature of the substrate 101 near the liquid discharge element array 103 while avoiding the influence of the driver circuit 104. With the arrangement as shown in FIG. 11, the temperature detection unit 108 is arranged near the corresponding liquid discharge element array 103 and apart from the driver circuit 104 that drives the corresponding liquid discharge element array 103. The temperature of the substrate 101 can be detected at higher precision, improving the characteristic of discharging a liquid from the liquid discharge head substrate 800.

In the arrangement shown in FIG. 11, one control circuit 105 is used to control all the temperature detection units 108 corresponding to one liquid discharge element array 103, but the present disclosure is not limited to this example. For example, two control circuits 105 may be used to control the temperature detection units 108 corresponding to one liquid discharge element array 103.

Figure 12A:
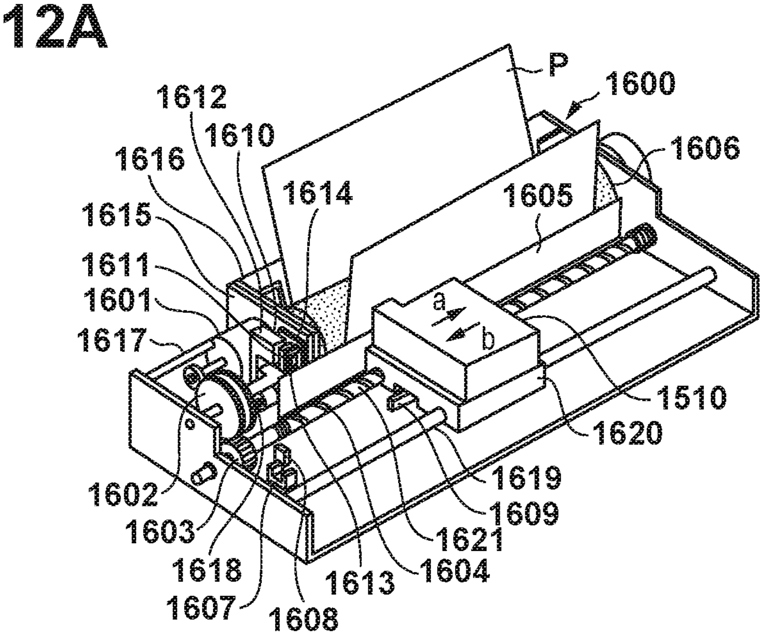
FIGS. 12A to 12D are views showing an example of the arrangement of a liquid discharge apparatus using the liquid discharge head substrate in FIG. 1, 5, 7, or 8.

A liquid discharge apparatus using the above-described liquid discharge head substrate 100, 500, 700, or 800 will be explained with reference to FIGS. 12A to 12D. FIG. 12A exemplifies the internal arrangement of a liquid discharge apparatus 1600 typified by an inkjet printer, a facsimile apparatus, or a copying machine. In this example, the liquid discharge apparatus may also be called a printing apparatus. The liquid discharge apparatus 1600 includes a liquid discharge head 1510 that discharges a liquid (in this example, ink or a printing material) to a predetermined medium P (in this example, a printing medium such as paper). In this example, the liquid discharge head may also be called a record head. The liquid discharge head 1510 is mounted on a carriage 1620, and the carriage 1620 can be attached to a lead screw 1621 having a helical groove 1604. The lead screw 1621 can rotate in synchronization with rotation of a driving motor 1601 via driving force transmission gears 1602 and 1603. The liquid discharge head 1510 can move in a direction indicated by an arrow a orb along a guide 1619 together with the carriage 1620.

The medium P is pressed by a paper press plate 1605 in the carriage moving direction and fixed to a platen 1606. The liquid discharge apparatus 1600 performs liquid discharge (in this example, printing) to the medium P conveyed on the platen 1606 by a conveyance unit (not shown) by reciprocating the liquid discharge head 1510.

The liquid discharge apparatus 1600 confirms the position of a lever 1609 provided on the carriage 1620 via photocouplers 1607 and 1608, and switches the rotational direction of the driving motor 1601. A support member 1610 supports a cap member 1611 for covering the nozzle (liquid orifice or simply orifice) of the liquid discharge head 1510. A suction portion 1612 performs recovery processing of the liquid discharge head 1510 by sucking the interior of the cap member 1611 via an intra-cap opening 1613. A lever 1617 is provided to start recovery processing by suction, and moves along with movement of a cam 1618 engaged with the carriage 1620. A driving force from the driving motor 1601 is controlled by a well-known transmission mechanism such as a clutch switch.

A main body support plate 1616 supports a moving member 1615 and a cleaning blade 1614. The moving member 1615 moves the cleaning blade 1614 to perform recovery processing of the liquid discharge head 1510 by wiping. The liquid discharge apparatus 1600 includes a controller (not shown) and the controller controls driving of each mechanism described above.

Figure 12B:
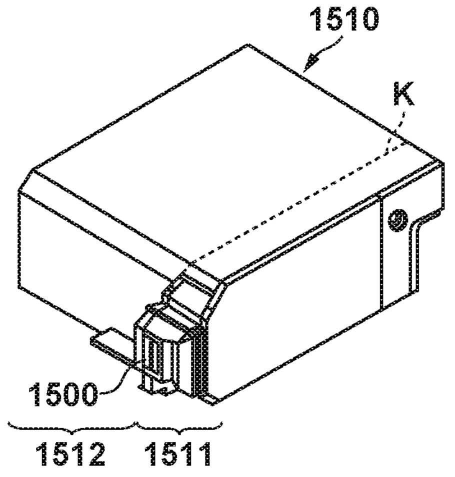

FIG. 12B exemplifies the outer appearance of the liquid discharge head 1510. The liquid discharge head 1510 can include a head portion 1511 having a plurality of nozzles 1500, and a tank (liquid storage portion) 1512 that holds a liquid to be supplied to the head portion 1511. The tank 1512 and the head portion 1511 can be separated at, for example, a broken line K and the tank 1512 is interchangeable. The liquid discharge head 1510 has an electrical contact (not shown) for receiving an electrical signal from the carriage 1620 and discharges a liquid in accordance with the electrical signal. The tank 1512 has a fibrous or porous liquid holding member (not shown) and the liquid holding member can hold a liquid.

Figure 12C:
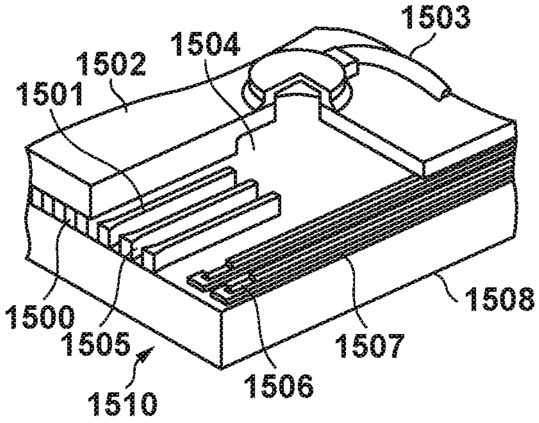

FIG. 12C exemplifies the internal arrangement of the liquid discharge head 1510. The liquid discharge head 1510 includes a base 1508, flow path wall members 1501 that are arranged on the base 1508 and form flow paths 1505, and a top plate 1502 having a liquid supply path 1503. The base 1508 may be either of the above-described liquid discharge head substrates 100, 500, 700, and 800. As discharge elements or liquid discharge elements, heaters 1506 (to be also referred to as electrothermal transducers or heat generating resistive elements) are arrayed on the substrate (liquid discharge head substrate) of the liquid discharge head 1510 in correspondence with the respective nozzles 1500. Each heater 1506 is driven to generate heat by turning on a driving element (switching element such as a transistor) provided in correspondence with the heater 1506.

A liquid from the liquid supply path 1503 is stored in a common liquid chamber 1504 and supplied to each nozzle 1500 via the corresponding flow path 1505. The liquid supplied to each nozzle 1500 is discharged from the nozzle 1500 in response to driving of the heater 1506 corresponding to the nozzle 1500.

Figure 12D:
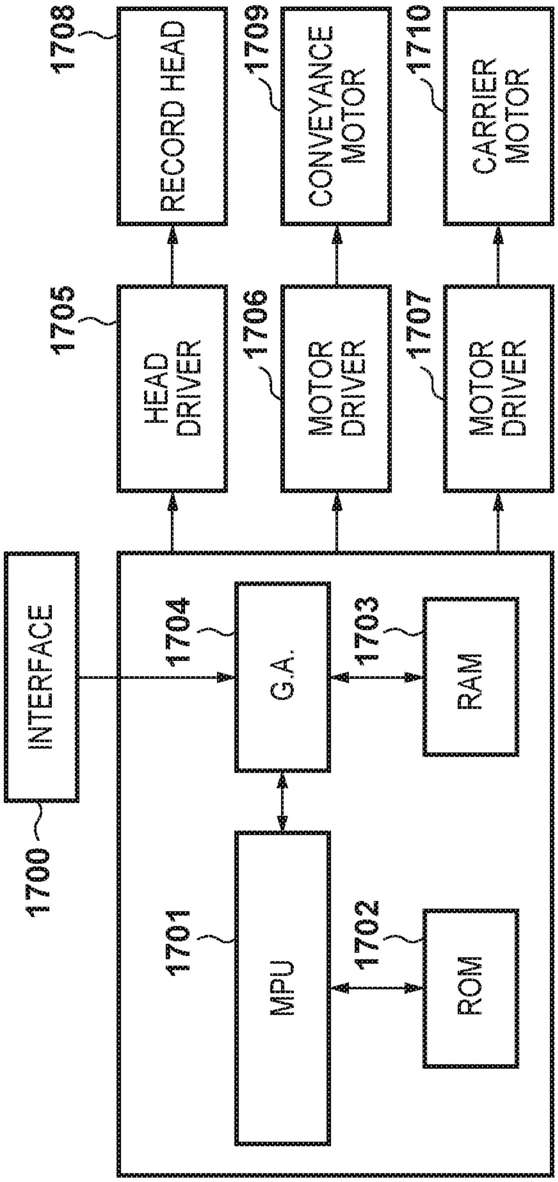

FIG. 12D exemplifies the system arrangement of the liquid discharge apparatus 1600. The liquid discharge apparatus 1600 includes an interface 1700, a MPU 1701, a ROM 1702, a RAM 1703, and a gate array (G.A.) 1704. The interface 1700 receives from the outside an external signal for executing liquid discharge. The ROM 1702 stores a control program to be executed by the MPU 1701. The RAM 1703 saves various signals and data such as the above-mentioned external signal for liquid discharge and data supplied to the liquid discharge head 1708. The gate array 1704 performs supply control of data to the liquid discharge head 1708 and control of data transfer between the interface 1700, the MPU 1701, and the RAM 1703.

The liquid discharge apparatus 1600 further includes a head driver 1705, motor drivers 1706 and 1707, a conveyance motor 1709, and a carrier motor 1710. The carrier motor 1710 conveys a liquid discharge head 1708. The conveyance motor 1709 conveys the medium P. The head driver 1705 drives the liquid discharge head 1708. The motor drivers 1706 and 1707 drive the conveyance motor 1709 and the carrier motor 1710, respectively.

When a driving signal is input to the interface 1700, it can be converted into data for liquid discharge between the gate array 1704 and the MPU 1701. Each mechanism performs a desired operation in accordance with this data. In this manner, the liquid discharge head 1708 is driven.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-063544, filed Apr. 6, 2022, which is hereby incorporated by reference herein in its entirety.

What is claimed is:

1. A liquid discharge head substrate comprising:

a substrate;

a plurality of liquid discharge elements arranged in a first direction on a major surface of the substrate to discharge a liquid;

a liquid supply port provided in the substrate and spaced apart from the plurality of liquid discharge elements in a second direction crossing the first direction to supply the liquid to the plurality of liquid discharge elements;

a plurality of temperature detection elements arranged on the substrate to detect a temperature of the substrate; and a driving wiring pattern that extends in the second direction to drive the plurality of temperature detection elements, wherein the driving wiring pattern extends to an end portion of the substrate in the second direction, is connected to an external connection terminal, and is shared between the plurality of temperature detection elements, wherein each of the plurality of temperature detection elements is connected to one extending portion of the driving wiring pattern that extends in the second direction, wherein the plurality of temperature detection elements includes a first temperature detection element and a second temperature detection element that are spaced apart from each other in the first direction, and includes a third temperature detection element that is spaced apart from the first temperature detection element in the second direction, wherein each of the plurality of temperature detection elements is connected to the driving wiring pattern via a switching element, and wherein, of a plurality of switching elements, a first switching element is arranged between the first temperature detection element and the driving wiring pattern, and a second switching element is arranged between the second temperature detection element and the driving wiring pattern and the first switching element and the second switching element are connected to an extending portion that extends in the first direction, out of a control wiring pattern for selecting the first switching element and the second switching element.

2. The liquid discharge head substrate according to claim 1, wherein at least one of two terminals of each of the plurality of temperature detection elements is connected to a monitoring wiring pattern.

3. The liquid discharge head substrate according to claim 1, wherein the one extending portion is a first extending portion, and the first temperature detection element and the second temperature detection element are connected to the first extending portion via a second extending portion of the driving wiring pattern that extends in the first direction.

4. The liquid discharge head substrate according to claim 1, wherein of the control wiring pattern, a portion extending in the second direction in parallel with the plurality of liquid discharge elements and the liquid supply port is one.

5. The liquid discharge head substrate according to claim 1, further comprising a control circuit configured to control the first switching element and the second switching element via the control wiring pattern.

6. The liquid discharge head substrate according to claim 5, wherein the control circuit is configured to control driving of the plurality of liquid discharge elements.

7. The liquid discharge head substrate according to claim 5, further comprising a driver circuit configured to drive the plurality of liquid discharge elements under control of the control circuit, wherein the plurality of liquid discharge elements and the liquid supply port are arranged between the first temperature detection elements and the second temperature detection elements, and the driver circuit.

8. The liquid discharge head substrate according to claim 1, wherein the plurality of temperature detection elements includes a first temperature detection element and a second temperature detection element that are spaced apart from each other in the first direction, and includes a third temperature detection element that is spaced apart from the first temperature detection element in the second direction, wherein the first temperature detection element and the third temperature detection element are connected to a first extending portion of the driving wiring pattern that extends in the second direction, and wherein the second temperature detection element is connected to a second extending portion of the driving wiring pattern that extends in the second direction and is different from the first extending portion.

9. The liquid discharge head substrate according to claim 1, wherein a plurality of beams formed integrally with the substrate are arranged at the liquid supply port, and wherein, of the plurality of beams, a beam through which the driving wiring pattern runs, and a beam through which a wiring pattern for controlling the switching element runs are different from each other.

10. The liquid discharge head substrate according to claim 1, wherein a beam formed integrally with the substrate is arranged at the liquid supply port, and the driving wiring pattern runs through the beam.

11. The liquid discharge head substrate according to claim 1, wherein a plurality of beams formed integrally with the substrate are arranged at the liquid supply port, and the driving wiring pattern runs through at least two beams of the plurality of beams.

12. A liquid discharge head comprising:

the liquid discharge head substrate according to claim 1; and an orifice for which discharge of a liquid is controlled by the liquid discharge head substrate.

13. A liquid discharge apparatus comprising:

a liquid discharge head having the liquid discharge head substrate according to claim 1, and an orifice for which discharge of a liquid is controlled by the liquid discharge head substrate; and a unit configured to supply a driving signal for discharging a liquid from the liquid discharge head.

* * * * *